(12) United States Patent
Okabayashi et al.

(10) Patent No.: US 10,882,605 B2
(45) Date of Patent: Jan. 5, 2021

(54) RIBLET STRUCTURE AND OBJECT

(71) Applicant: JAPAN AEROSPACE EXPLORATION AGENCY, Chofu (JP)

(72) Inventors: Kie Okabayashi, Tokyo (JP); Yasuhiro Koshioka, Tokyo (JP); Akira Nishizawa, Tokyo (JP); Mitsuru Kurita, Tokyo (JP); Hidetoshi Iijima, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 241 days.

(21) Appl. No.: 16/080,772

(22) PCT Filed: Oct. 27, 2016

(86) PCT No.: PCT/JP2016/081914
§ 371 (c)(1),
(2) Date: Aug. 29, 2018

(87) PCT Pub. No.: WO2017/149837
PCT Pub. Date: Sep. 8, 2017

(65) Prior Publication Data
US 2019/0023379 A1    Jan. 24, 2019

(30) Foreign Application Priority Data

Mar. 3, 2016   (JP) .................................. 2016-041018

(51) Int. Cl.
*B64C 21/10*   (2006.01)
*F15D 1/00*    (2006.01)
*F15D 1/12*    (2006.01)

(52) U.S. Cl.
CPC .............. *B64C 21/10* (2013.01); *F15D 1/004* (2013.01); *F15D 1/12* (2013.01); *B64C 2230/26* (2013.01); *Y02T 50/10* (2013.01)

(58) Field of Classification Search
CPC ..... B64C 21/10; B64C 2230/26; F15D 1/004; F15D 1/12; Y02T 50/166
See application file for complete search history.

(56) References Cited

U.S. PATENT DOCUMENTS 7,041,363 B2 * 5/2006 Krohmer .................. B63B 1/34
                                                    244/130
7,090,548 B1 * 8/2006 Gusler ................. A61B 5/0215
                                                    114/312

(Continued)

FOREIGN PATENT DOCUMENTS

FR      2899945 A1     10/2007
JP   2005-522644 A      7/2005

(Continued)

OTHER PUBLICATIONS

Peet et al., "Turbulent Drag Reduction using Sinusoidal Riblets with Triangular Cross-Section", Proc. of the 38th AIAA Fluid Dynamics Conference and Exhibit, Jun. 23-26, 2008, No. AIAA-2008-3745 (9 pages).

(Continued)

*Primary Examiner* — Brian M O'Hara
(74) *Attorney, Agent, or Firm* — Westerman, Hattori, Daniels & Adrian, LLP

(57) ABSTRACT

The present invention provides a riblet structure that further reduces drag, which is a sum of turbulent friction drag and pressure drag, and an object including such a riblet structure. An object such as an aircraft, plant, and pipeline includes a wavelike riblet pattern on a surface. The wavelike riblet pattern includes a large number of wavelike riblets. Each of the large number of wave riblets includes a wavelike ridge (Continued)

line, and a height thereof changes cyclically with respect to a fluid flow direction. With such a configuration, drag, which is a sum of turbulent friction drag and pressure drag, can be further reduced.

4 Claims, 2 Drawing Sheets

(56) References Cited

U.S. PATENT DOCUMENTS

| | | | |
|---|---|---|---|
| 8,460,779 B2 * | 6/2013 | Gupta | B64C 21/10 428/156 |
| 2004/0155150 A1 | 8/2004 | Krohmer et al. | |
| 2012/0025025 A1 | 2/2012 | Brennan et al. | |

FOREIGN PATENT DOCUMENTS

| | | |
|---|---|---|
| WO | 03/087604 A1 | 10/2003 |
| WO | 2009/000703 A1 | 12/2008 |

OTHER PUBLICATIONS

International Search Report dated Jan. 24, 2017, issued in counterpart application No. PCT/JP2016/081914, w/ English translation. (3 pages).
Extended European Search Report dated Sep. 30, 2019, issued in counterpart European Application No. 16892673.1 (6 pages).

* cited by examiner

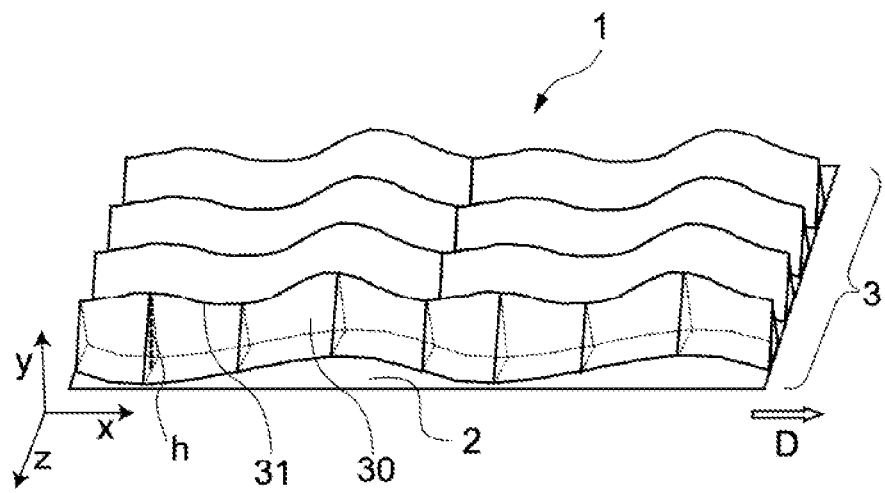
FIG.1
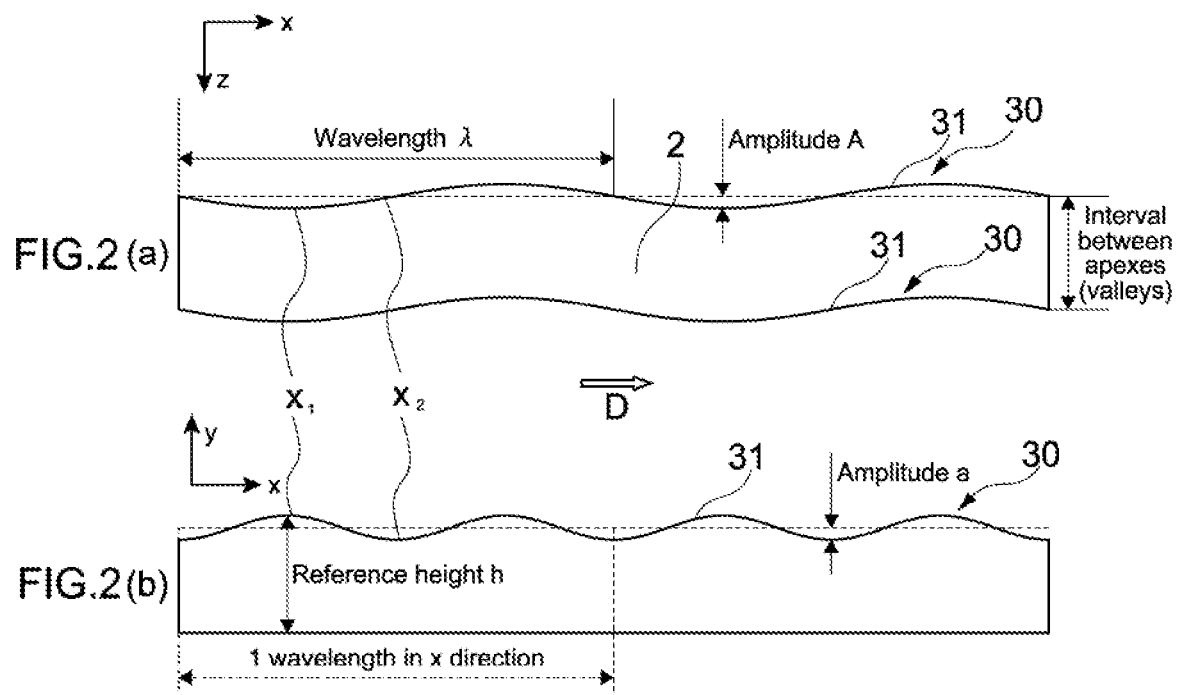
FIG.2(a)
FIG.2(b)

RIBLET STRUCTURE AND OBJECT

TECHNICAL FIELD

The present invention relates to an object including a surface on which fluid flows and a riblet structure applied to such an object.

BACKGROUND ART

It is known that, by providing a riblet pattern on a surface of an aircraft, a wall surface of a pipeline, and the like, turbulent friction drag of gas and liquid that flow on these surfaces is reduced.

Typically, the riblet pattern is formed by arranging, on a surface of an object on which fluid flows, a large number of fine riblets that each have a triangular cross section and extend in a direction in which the fluid flows, at predetermined intervals.

In the beginning of development of riblets, ridge lines thereof were linear with respect to a fluid flow direction (longitudinal direction), but in recent years, riblets having a sinusoidal shape have been proposed (see Patent Literature 1 and Non-patent Literature 1). It is reported that with such sinusoidal riblets, drag is further reduced as compared to linear riblets.

CITATION LIST

Patent Literature

Patent Literature 1: WO 2009/000703 A1

Non-Patent Literature

Non-Patent Literature 1: Peet et al., "Turbulent Drag Reduction Using Sinusoidal Riblets with Triangular Cross-Section", Proc. Of the 38th AIAA Fluid Dynamics Conference and Exhibit, No. AIAA-2008-3745, 2008.

DISCLOSURE OF INVENTION

Technical Problem

If an amplitude of the sinusoidal ridge lines of the sinusoidal riblets becomes large, an effect of further reducing turbulent friction drag of the fluid that flows on the surface can be obtained. However, if the amplitude of the ridge lines becomes large as described above, pressure drag of the fluid with respect to the riblets becomes large. In other words, the turbulent friction drag of the fluid and the pressure drag of the fluid are in a tradeoff relationship with respect to a magnitude of the amplitude of the sinusoidal riblets. Therefore, in the sinusoidal riblets, there is a problem that total drag of the fluid with respect to the riblets, that is, drag obtained by adding the turbulent friction drag and the pressure drag cannot be reduced to a certain extent or less.

In view of the circumstances as described above, an object of the present invention is to provide a riblet structure and an object, that include wavelike riblets with which drag obtained by adding turbulent friction drag and pressure drag can be further reduced.

Solution to Problem

To attain the object described above, a riblet structure according to an embodiment of the present invention includes a plurality of wavelike riblets, and a height of each of the plurality of wavelike riblets is set to become smaller as an angle formed between a ridge line and a fluid flow direction becomes larger.

Here, it is favorable for the ridge line of each of the plurality of wavelike riblets to have a sinusoidal shape of a first wavelength, and the height of each of the plurality of wavelike riblets to increase/decrease in a sinusoidal shape of a second wavelength as a half wavelength of the first wavelength in the fluid flow direction.

Further, when a reference height of the wavelike riblets is represented by h, it is further favorable for an amplitude a of the second wavelength to satisfy $$0 < a \leq 0.2\ h.$$

It is further favorable for the plurality of wavelike riblets to be arranged at constant intervals, and each of the plurality of wavelike riblets to be arranged while keeping a constant interval from adjacent wavelike riblets. Of course, the intervals may differ.

An object according to another embodiment of the present invention includes a wavelike riblet pattern including wavelike ridge lines, a height of the wavelike riblet pattern changing cyclically with respect to a fluid flow direction.

In the present invention, typically, in the wavelike riblets, by alleviating generation of pressure drag by lowering a height of a crest of the riblets at a phase that becomes a cause of high pressure drag (phase at which angle formed between ridge line of riblet and fluid flow direction becomes large), it becomes possible to reduce drag obtained by adding turbulent friction drag and pressure drag as compared to linear and wavelike shapes of the past.

Advantageous Effects of Invention

According to the present invention, it is possible to further reduce drag obtained by adding turbulent friction drag and pressure drag.

BRIEF DESCRIPTION OF DRAWINGS

FIG. 1 is a perspective view of an object according to an embodiment of the present invention.

FIGS. 2(a) and 2(b) are diagrams for explaining a change of a height of wavelike riblets shown in FIG. 1 in a fluid flow direction (x direction).

MODES FOR CARRYING OUT THE INVENTION

Hereinafter, an embodiment of the present invention will be described with reference to the drawings.

FIG. 1 is a perspective view of an object according to an embodiment of the present invention.

As shown in FIG. 1, an object 1 includes a wavelike riblet pattern 3 on a surface 2 thereof.

The object 1 is an object that includes a surface on which fluid flows, such as an aircraft, a plant, and a pipeline, for example.

The surface 2 is an outer surface in terms of an aircraft. Alternatively, the object 1 may take a form of a sheet and may be attached to a desired position of the aircraft. Regarding the pipeline, the surface 2 refers to an inner wall portion through which liquid flows.

The wavelike riblet pattern 3 is constituted of a large number of wavelike riblets 30 that have wavelike ridge lines 31 and whose height h changes cyclically with respect to a fluid flow direction D.

Here, the ridge lines 31 are typically lines formed by apexes of triangular cross sections that each have an apex angle of about 30°, but even if the apexes are not constituted of corners and the apexes are, for example, a plane or a curved surface, these cases are also included, and a long surface formed by these surfaces is regarded substantially as the ridge line, for example. Of course, the cross-sectional shape may be other than a triangular shape, such as a square shape, for example. Further, although the wavelike shape is typically a sinusoidal shape, it is meant to include any curved surface excluding the sinusoidal shape as long as it is formed continuously to some extent. In the present invention, the entire riblet pattern of the surface 2 may be the wavelike riblet pattern 3, or a part of the riblet pattern of the surface 2 may be the wavelike riblet pattern 3.

Figure 3:
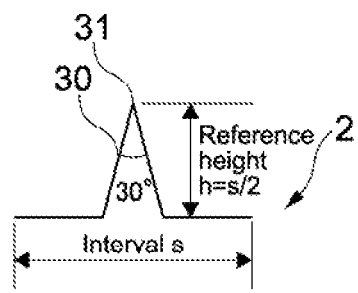
FIG. 3 is a cross-sectional diagram of the wavelike riblets having a reference height, the diagram being perpendicular to the flow direction (x direction).

FIGS. 2(a) and 2(b) are diagrams for explaining a change of a height of the wavelike riblets 30 shown in FIG. 1 in the fluid flow direction (x direction). FIG. 2(a) is a diagram showing the surface 2 of the object 1 from an upper surface (y direction), and FIG. 2(b) is a diagram showing the surface 2 of the object 1 from a lateral direction (z direction). In FIG. 2(a) and FIG. 2(b), phases in the x direction are made to coincide. FIG. 3 is a cross-sectional diagram of the wavelike riblets 30 having a reference height, the diagram being perpendicular to the flow direction (x direction).

As shown in FIGS. 2(a), 2(b), and 3, a height $h_x$ of the wavelike riblets 30 becomes smaller as an angle θ formed by the ridge line 31 and the fluid flow direction D becomes larger.

As shown in FIGS. 2 and 3, a height $h_x$ of the wavelike riblets 30 becomes smaller as an angle θ formed by the ridge line 31 and the fluid flow direction D becomes larger.

The ridge line 31 of the wavelike riblet 30 according to this embodiment has a sinusoidal shape of a wavelength λ (see FIG. 2(a)). Therefore, the height $h_x$ of the wavelike riblets 30 increases/decreases (changes) in a sinusoidal shape of a wavelength λ/2 as a half wavelength of the sinusoidal wave in the fluid flow direction D (see FIG. 2(b)). For example, since the angle θ formed between the ridge line 31 and the fluid flow direction D is 0 at a point $x_1$ of the ridge line 31 in FIG. 2(a), a height $h_{x1}$ of the wavelike riblet 30 corresponding to this position becomes maximum (see point $x_1$ in FIG. 2(b)). On the other hand, since the angle θ formed between the ridge line 31 and the fluid flow direction D is maximum at a point $x_2$ of the ridge line 31 in FIG. 2(a), the height $h_{x2}$ of the wavelike riblet 30 corresponding to this position becomes minimum (see point $x_2$ in FIG. 2(b)).

Here, typically, it is favorable for an amplitude A of the ridge line 31 of the wavelike riblet 30 to satisfy $$\tan^1(2n*\lambda/A)=10°.$$

Further, as shown in FIG. 3, when an interval between the wavelike riblets 30, which is a pitch of the wavelike riblets 30 in the wavelike riblet pattern 3, is represented by s, it is favorable for a reference height h of the wavelike riblets 30 to satisfy $$h=s/2.$$

It is favorable for an amplitude a of a wavelength corresponding to a change in the height of the wavelike riblets 30 to take a value that satisfies $$0<a\leq0.2\ h$$

with respect to the reference height h.

As a result of a study while fixing at s+=20, it was confirmed that, when the amplitude a is 0.2 h or less, pressure drag decreases, and also friction drag decreases.

Next, a result of a test conducted to confirm the effects of the present invention will be described.

Figure 4:
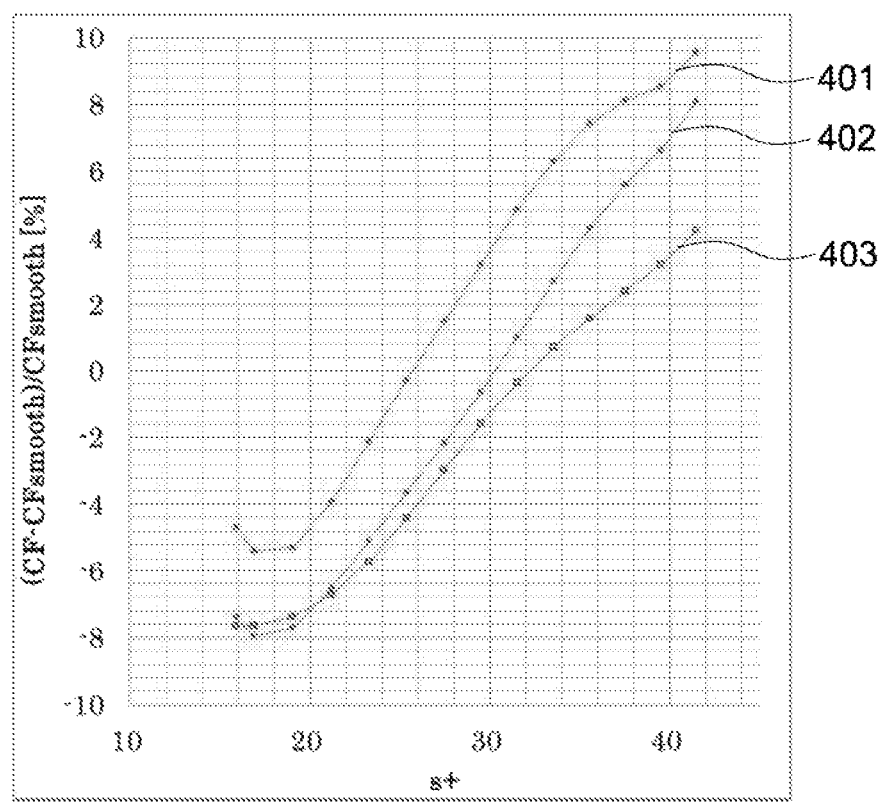
FIG. 4 is a graph showing curves of drag increase rates of various riblets obtained by a wind tunnel test.

FIG. 4 shows curves of drag increase rates of various riblets obtained by a wind tunnel test.

Here, the drag increase rate is a value with respect to a wall index s+ of an interval of apexes of the riblets (corresponding to interval s described above).

In FIG. 4, the reference numeral 401 indicates a drag increase rate of a linear riblet, the reference numeral 402 indicates a drag increase rate of a wavelike riblet of the past (wavelike riblet having constant height), and the reference numeral 403 indicates a drag increase rate of a wavelike riblet according to the present invention.

Here, a parameter of the linear riblet is height h=s/2 (variable value). Parameters of the wavelike riblet of the past are ridge line wavelength λ+=1131 (fixed value) of the ridge line, amplitude A=0.03λ (fixed value), and height h=s/2 (variable value). Parameters of the wavelike riblet according to the present invention are ridge line wavelength λ=1131 (fixed value), amplitude A=0.03λ (fixed value), reference height h=s/2 (variable value), and amplitude a=0.1 h (variable value). λ, A, and h described above are considered to be a combination of a wavelength and amplitude of a ridge line having the highest drag reduction effect in the wavelike riblet of the past.

The definition of the drag increase rate (y axis in FIG. 4) is drag increase rate={(total drag on riblet surface)−(total drag on smooth surface)}/(total drag on smooth surface).

The smooth surface is a surface without a riblet.

It can be seen that in s+ of the measured range (x axis in FIG. 4), the drag reduction effect is higher in the wavelike riblet of the past and the wavelike riblet according to the present invention than in the linear riblets. The drag increase rate becomes the smallest at s+=17 to 18, and it is usually the case that a real scale of the riblet apex interval is determined while setting a vicinity of this range as a design point. It can be seen from FIG. 4 that in the vicinity of the design point s+=17 to 18, there is hardly any difference between the wavelike riblet of the past and the wavelike riblet according to the present invention. However, it can be seen that, as s+ becomes larger than the design point, the drag reduction effect of the wavelike riblet according to the present invention is improved as compared to the wavelike riblet of the past.

For example, when mounting the riblets on an aircraft, it is not always possible to fly in the vicinity of the design point, so robustness with respect to the value of s+ other than the design point is important. In other words, according to the present invention, it can be said that the robustness of the drag reduction effect is improved as compared to the wavelike riblet of the past.

As described above, it has been confirmed by the wind tunnel test that the robustness of the drag reduction effect is improved by the present invention.

For example, in an aircraft, improvement of a drag reduction rate by about 1% corresponds to about 3% a fuel consumption reduction amount. Converting to $CO_2$ emission, 700 tons/year can be reduced per one Airbus A320 (150 to 180 seats), which greatly contributes to global warming countermeasures.

The present invention can be applied to various technical fields.

For example, by applying the present invention to plants and pipelines, it is possible to improve fluid transport efficiency and the like.

Further, by applying the present invention to a field of fluid machinery, friction drag can be reduced.

REFERENCE SIGNS LIST 1 object
2 surface
3 wavelike riblet pattern
30 wavelike riblet
31 ridge line
D fluid flow direction
h height

The invention claimed is:

1. A riblet structure, comprising
a plurality of wavelike riblets,
a height of each of the plurality of wavelike riblets being set in a first direction to become smaller as an angle formed between a ridge line and a surface of the riblet structure becomes larger,
wherein a fluid flow direction is parallel to the surface of the riblet structure,
wherein the first direction is perpendicular to the fluid flow direction,
wherein the ridge line of each of the plurality of wavelike riblets has a sinusoidal shape of a first wavelength, and
the height of each of the plurality of wavelike riblets increases/decreases in a sinusoidal shape of a second wavelength as a half wavelength of the first wavelength in the fluid flow direction.

2. The riblet structure according to claim 1, wherein
when a reference height of the wavelike riblets is represented by h, an amplitude a of the second wavelength satisfies $0 < a \leq 0.2\ h.$ 3. The riblet structure according to claim 1, wherein
the plurality of wavelike riblets are arranged at constant intervals.

4. An object, comprising
a wavelike riblet pattern including wavelike ridge lines, a height of the wavelike riblet pattern in a first direction changing cyclically with respect to a surface of the object,
wherein a fluid flow direction is parallel to the surface of the object,
wherein the first direction is perpendicular to the fluid flow direction,
wherein the wavelike ridge lines have a sinusoidal shape of a first wavelength, and
the height of the wavelike riblet pattern increases/decreases in a sinusoidal shape of a second wavelength as a half wavelength of the first wavelength in the fluid flow direction.

* * * * *